United States Patent
Kumar

(10) Patent No.: US 10,938,837 B2
(45) Date of Patent: Mar. 2, 2021

(54) ISOLATED NETWORK STACK TO MANAGE SECURITY FOR VIRTUAL MACHINES

(71) Applicant: Nicira, Inc., Palo Alto, CA (US)

(72) Inventor: Vasantha Kumar, Chennai (IN)

(73) Assignee: NICIRA, INC., Palo Alto, CA (US)

( * ) Notice: Subject to any disclaimer, the term of this patent is extended or adjusted under 35 U.S.C. 154(b) by 168 days.

(21) Appl. No.: 15/421,121

(22) Filed: Jan. 31, 2017

(65) Prior Publication Data

US 2018/0063160 A1    Mar. 1, 2018

(30) Foreign Application Priority Data

Aug. 30, 2016    (IN) .............................. 201641029536

(51) Int. Cl.
*H04L 29/06* (2006.01)
*G06F 21/53* (2013.01)

(52) U.S. Cl.
CPC .......... *H04L 63/1408* (2013.01); *G06F 21/53* (2013.01); *H04L 63/20* (2013.01)

(58) Field of Classification Search
CPC ....... G06F 9/45558; G06F 2009/45595; G06F 2009/4557; G06F 2009/45587; G06F 21/53; G06F 21/554; G06F 21/6218; G06F 9/45533; G06F 2009/45579; G06F 21/55; G06F 17/30082; G06F 21/50; G06F 21/566; H04L 41/0893; H04L 63/20; H04L 47/20; H04L 2212/00
See application file for complete search history.

(56) References Cited

U.S. PATENT DOCUMENTS

| | | |
|---|---|---|
| 5,826,051 A | 10/1998 | Porter et al. |
| 5,950,195 A | 9/1999 | Stockwell et al. |
| 6,363,477 B1 | 3/2002 | Fletcher et al. |
| 6,430,188 B1 | 8/2002 | Kadambi et al. |
| 6,496,935 B1 | 12/2002 | Fink et al. |
| 6,781,990 B1 | 8/2004 | Puri et al. |

(Continued)

FOREIGN PATENT DOCUMENTS

| | | |
|---|---|---|
| EP | 2748750 A1 | 7/2014 |
| WO | 2008095010 A1 | 8/2008 |

(Continued)

OTHER PUBLICATIONS

Author Unknown, "CISCO Identity-Based Firewall Security," Month Unknown 2011, 2 pages, CISCO Systems, Inc.

(Continued)

*Primary Examiner* — Taghi T Arani
*Assistant Examiner* — Lin Chang
(74) *Attorney, Agent, or Firm* — Adeli LLP

(57) ABSTRACT

Some embodiments provide a novel method for monitoring network requests from a machine. The method captures the network request at various layers of a protocol stack. At a first layer of a protocol stack, the method tags a packet related to the network request with a tag value, maps the tag value to a set of tuples associated with the packet, and sends a first set of data related to the packet to a security engine. At a second layer of the network stack, the method determines whether the packet has been modified through the network stack, and sends an updated second set of data to the security engine when the packet has been modified.

20 Claims, 11 Drawing Sheets

(56) References Cited

U.S. PATENT DOCUMENTS

| | | |
|---|---|---|
| 6,880,089 B1 | 4/2005 | Bommareddy et al. |
| 7,055,173 B1 | 5/2006 | Chaganty et al. |
| 7,349,382 B2 | 3/2008 | Marimuthu et al. |
| 7,543,054 B1 | 6/2009 | Bansod et al. |
| 7,639,613 B1 | 12/2009 | Ghannadian et al. |
| 7,818,452 B2 | 10/2010 | Matthews et al. |
| 7,843,843 B1 | 11/2010 | Papp, III et al. |
| 7,948,986 B1 | 5/2011 | Ghosh et al. |
| 8,031,599 B2 | 10/2011 | Duffield et al. |
| 8,032,933 B2 | 10/2011 | Turley et al. |
| 8,095,662 B1 | 1/2012 | Lappas et al. |
| 8,190,767 B1 | 5/2012 | Maufer et al. |
| 8,365,294 B2 | 1/2013 | Ross |
| 8,381,209 B2 | 2/2013 | Reumann et al. |
| 8,418,249 B1* | 4/2013 | Nucci .................. G06F 21/552 706/20 |
| 8,484,739 B1 | 7/2013 | Seshadri |
| 8,655,307 B1 | 2/2014 | Walker et al. |
| 8,660,129 B1 | 2/2014 | Brendel et al. |
| 8,953,453 B1 | 2/2015 | Xiao et al. |
| 8,966,035 B2 | 2/2015 | Casado et al. |
| 9,009,836 B1* | 4/2015 | Yarykin .............. G06F 9/45558 726/24 |
| 9,015,823 B2 | 4/2015 | Koponen et al. |
| 9,215,214 B2 | 12/2015 | Bansal et al. |
| 9,317,696 B2 | 4/2016 | Ayres et al. |
| 9,413,667 B2 | 8/2016 | Beliveau et al. |
| 9,444,841 B2 | 9/2016 | Feroz et al. |
| 9,565,202 B1 | 2/2017 | Kindlund et al. |
| 9,596,135 B1 | 3/2017 | Thomas et al. |
| 9,762,619 B1 | 9/2017 | Vaidya et al. |
| 9,891,940 B2 | 2/2018 | Feroz et al. |
| 9,948,611 B2 | 4/2018 | Kumar et al. |
| 9,996,697 B2 | 6/2018 | Mahaffey et al. |
| 10,033,693 B2 | 7/2018 | Sengupta et al. |
| 10,228,959 B1* | 3/2019 | Anderson ........... G06F 9/45558 |
| 10,324,746 B2 | 6/2019 | Kumar et al. |
| 10,333,983 B2 | 6/2019 | Vaidya et al. |
| 10,503,536 B2 | 12/2019 | Gunda |
| 2002/0116523 A1 | 8/2002 | Warrier et al. |
| 2002/0122422 A1 | 9/2002 | Kenney et al. |
| 2003/0005118 A1 | 1/2003 | Williams |
| 2003/0093481 A1 | 5/2003 | Mitchell et al. |
| 2003/0093672 A1 | 5/2003 | Cichowlas |
| 2004/0049701 A1 | 3/2004 | Pennec et al. |
| 2004/0098620 A1 | 5/2004 | Shay |
| 2004/0117407 A1 | 6/2004 | Kumar et al. |
| 2004/0162901 A1 | 8/2004 | Mangipudi et al. |
| 2005/0080898 A1 | 4/2005 | Block |
| 2005/0114711 A1 | 5/2005 | Hesselink et al. |
| 2005/0198125 A1 | 9/2005 | Beck et al. |
| 2005/0257244 A1 | 11/2005 | Joly et al. |
| 2005/0286457 A1 | 12/2005 | Foster et al. |
| 2006/0092861 A1 | 5/2006 | Corday et al. |
| 2007/0061492 A1 | 3/2007 | Riel |
| 2007/0101432 A1* | 5/2007 | Carpenter ............ G06F 21/552 726/25 |
| 2007/0143851 A1 | 6/2007 | Nicodemus et al. |
| 2008/0059474 A1 | 3/2008 | Lim |
| 2008/0072305 A1 | 3/2008 | Casado et al. |
| 2008/0267177 A1 | 10/2008 | Johnson et al. |
| 2008/0289028 A1 | 11/2008 | Jansen et al. |
| 2008/0298274 A1 | 12/2008 | Takashige et al. |
| 2008/0301630 A1 | 12/2008 | Arnold et al. |
| 2008/0316922 A1 | 12/2008 | Riddle et al. |
| 2008/0320550 A1 | 12/2008 | Strassner et al. |
| 2009/0007251 A1 | 1/2009 | Abzarian et al. |
| 2009/0055427 A1 | 2/2009 | Kulasingam et al. |
| 2009/0070442 A1 | 3/2009 | Kacin et al. |
| 2009/0129271 A1 | 5/2009 | Ramankutty et al. |
| 2009/0150521 A1 | 6/2009 | Tripathi |
| 2009/0178061 A1 | 7/2009 | Sandoval et al. |
| 2009/0187963 A1 | 7/2009 | Bori |
| 2009/0193497 A1 | 7/2009 | Kikuchi et al. |
| 2009/0228951 A1 | 9/2009 | Ramesh et al. |
| 2009/0235325 A1 | 9/2009 | Dimitrakos et al. |
| 2009/0249470 A1 | 10/2009 | Litvin et al. |
| 2009/0249472 A1 | 10/2009 | Litvin et al. |
| 2009/0254990 A1* | 10/2009 | McGee .................. G06F 21/51 726/22 |
| 2009/0265414 A1 | 10/2009 | Bryan |
| 2009/0281996 A1 | 11/2009 | Liu et al. |
| 2009/0327781 A1 | 12/2009 | Tripathi |
| 2010/0037311 A1 | 2/2010 | He et al. |
| 2010/0100616 A1 | 4/2010 | Bryson et al. |
| 2010/0125667 A1 | 5/2010 | Soundararajan |
| 2010/0138515 A1 | 6/2010 | Ruiz-Velasco et al. |
| 2010/0228819 A1 | 9/2010 | Wei |
| 2010/0251363 A1* | 9/2010 | Todorovic .............. G06F 21/53 726/22 |
| 2011/0016467 A1 | 1/2011 | Kane |
| 2011/0022695 A1 | 1/2011 | Dalal et al. |
| 2011/0055848 A1 | 3/2011 | Vainionpää et al. |
| 2011/0072486 A1 | 3/2011 | Hadar et al. |
| 2011/0103259 A1 | 5/2011 | Aybay et al. |
| 2011/0113467 A1 | 5/2011 | Agarwal et al. |
| 2011/0208960 A1 | 8/2011 | Flood |
| 2011/0225624 A1* | 9/2011 | Sawhney ............... G06F 21/53 726/1 |
| 2011/0238581 A1 | 9/2011 | Severson et al. |
| 2011/0246637 A1 | 10/2011 | Murakami |
| 2012/0158626 A1* | 6/2012 | Zhu ...................... G06F 21/56 706/13 |
| 2012/0207174 A1* | 8/2012 | Shieh .................... H04L 47/125 370/401 |
| 2012/0210423 A1* | 8/2012 | Friedrichs ........... G06F 21/564 726/22 |
| 2012/0222114 A1* | 8/2012 | Shanbhogue ......... G06F 21/53 726/22 |
| 2012/0240182 A1 | 9/2012 | Narayanaswamy et al. |
| 2012/0317570 A1 | 12/2012 | Dalcher et al. |
| 2013/0007740 A1 | 1/2013 | Kikuchi et al. |
| 2013/0007879 A1 | 1/2013 | Esteban et al. |
| 2013/0013669 A1 | 1/2013 | Chun et al. |
| 2013/0018994 A1 | 1/2013 | Flavel et al. |
| 2013/0019276 A1 | 1/2013 | Biazetti et al. |
| 2013/0073743 A1 | 3/2013 | Ramasamy et al. |
| 2013/0085880 A1 | 4/2013 | Roth et al. |
| 2013/0163594 A1 | 6/2013 | Sharma et al. |
| 2013/0205366 A1 | 8/2013 | Luna et al. |
| 2013/0219176 A1 | 8/2013 | Akella et al. |
| 2013/0227097 A1 | 8/2013 | Yasuda et al. |
| 2013/0227550 A1 | 8/2013 | Weinstein et al. |
| 2013/0268751 A1 | 10/2013 | Preiss et al. |
| 2013/0332983 A1 | 12/2013 | Koorevaar et al. |
| 2014/0007222 A1 | 1/2014 | Qureshi et al. |
| 2014/0020045 A1 | 1/2014 | Kabat et al. |
| 2014/0040182 A1 | 2/2014 | Gilder et al. |
| 2014/0059163 A1 | 2/2014 | Herbrich et al. |
| 2014/0067779 A1 | 3/2014 | Ojha |
| 2014/0068602 A1 | 3/2014 | Gember et al. |
| 2014/0115578 A1 | 4/2014 | Cooper et al. |
| 2014/0136681 A1 | 5/2014 | Greenlee et al. |
| 2014/0143863 A1* | 5/2014 | Deb ...................... G06F 21/552 726/22 |
| 2014/0155043 A1 | 6/2014 | Gell et al. |
| 2014/0173624 A1 | 6/2014 | Kurabayashi |
| 2014/0195666 A1 | 7/2014 | Dumitriu et al. |
| 2014/0215226 A1 | 7/2014 | Litty et al. |
| 2014/0226820 A1 | 8/2014 | Chopra et al. |
| 2014/0230008 A1 | 8/2014 | Feroz et al. |
| 2014/0237119 A1 | 8/2014 | Chung et al. |
| 2014/0281030 A1 | 9/2014 | Cui et al. |
| 2014/0282539 A1 | 9/2014 | Sonnek |
| 2014/0282855 A1 | 9/2014 | Clark et al. |
| 2015/0012964 A1 | 1/2015 | Xie et al. |
| 2015/0067818 A1 | 3/2015 | Molander et al. |
| 2015/0082301 A1* | 3/2015 | Garg .................... H04L 41/12 718/1 |
| 2015/0096007 A1 | 4/2015 | Sengupta et al. |
| 2015/0106438 A1 | 4/2015 | Fan et al. |
| 2015/0134822 A1 | 5/2015 | Bhagwat et al. |
| 2015/0154293 A1 | 6/2015 | Lu |

(56) References Cited

U.S. PATENT DOCUMENTS

| | | | |
|---|---|---|---|
| 2015/0163117 | A1 | 6/2015 | Lambeth et al. |
| 2015/0169345 | A1 | 6/2015 | DeCusatis et al. |
| 2015/0172208 | A1 | 6/2015 | DeCusatis et al. |
| 2015/0269383 | A1 | 9/2015 | Lang et al. |
| 2015/0350807 | A1 | 12/2015 | Andrews et al. |
| 2015/0358231 | A1* | 12/2015 | Zhang .............. H04L 45/38 370/392 |
| 2015/0358344 | A1 | 12/2015 | Mumcuoglu et al. |
| 2015/0379279 | A1 | 12/2015 | Feroz et al. |
| 2015/0381578 | A1 | 12/2015 | Thota et al. |
| 2016/0057167 | A1 | 2/2016 | Bach |
| 2016/0072669 | A1 | 3/2016 | Saavedra |
| 2016/0087905 | A1 | 3/2016 | Liu et al. |
| 2016/0119194 | A1 | 4/2016 | Lopez et al. |
| 2016/0173329 | A1 | 6/2016 | Latham et al. |
| 2016/0191413 | A1 | 6/2016 | Feroz et al. |
| 2016/0191521 | A1 | 6/2016 | Feroz et al. |
| 2016/0212167 | A1 | 7/2016 | Dotan et al. |
| 2016/0224789 | A1* | 8/2016 | Feroz .............. G06F 21/566 |
| 2016/0232024 | A1 | 8/2016 | Hamilton et al. |
| 2016/0234250 | A1 | 8/2016 | Ashley et al. |
| 2016/0241389 | A1 | 8/2016 | Saint et al. |
| 2016/0294923 | A1 | 10/2016 | Fan et al. |
| 2016/0330138 | A1 | 11/2016 | Thomason |
| 2016/0359658 | A1 | 12/2016 | Yadav et al. |
| 2017/0063883 | A1 | 3/2017 | Martinez |
| 2017/0063903 | A1 | 3/2017 | Muddu et al. |
| 2017/0093664 | A1 | 3/2017 | Lynam et al. |
| 2017/0099197 | A1 | 4/2017 | Raney |
| 2017/0118241 | A1* | 4/2017 | Call .............. H04L 63/1441 |
| 2017/0126677 | A1 | 5/2017 | Kumar et al. |
| 2017/0170990 | A1 | 6/2017 | Gaddehosur et al. |
| 2017/0171159 | A1 | 6/2017 | Kumar et al. |
| 2017/0230419 | A1 | 8/2017 | Prafullchandra et al. |
| 2017/0264628 | A1 | 9/2017 | Treat et al. |
| 2017/0302685 | A1 | 10/2017 | Ladnai et al. |
| 2017/0317978 | A1 | 11/2017 | Diaz-Cuellar et al. |
| 2018/0063194 | A1 | 3/2018 | Vaidya et al. |
| 2018/0103011 | A1 | 4/2018 | Li et al. |
| 2018/0159733 | A1 | 6/2018 | Poon et al. |
| 2018/0159943 | A1 | 6/2018 | Poon et al. |
| 2018/0181423 | A1 | 6/2018 | Gunda et al. |
| 2018/0181754 | A1 | 6/2018 | Gunda |
| 2018/0181763 | A1 | 6/2018 | Gunda |
| 2018/0183759 | A1 | 6/2018 | Gunda et al. |
| 2018/0183761 | A1 | 6/2018 | Gunda et al. |
| 2018/0183764 | A1 | 6/2018 | Gunda |
| 2018/0183866 | A1 | 6/2018 | Gunda et al. |
| 2018/0191763 | A1 | 7/2018 | Hillard et al. |
| 2018/0212818 | A1 | 7/2018 | Ide et al. |
| 2018/0241761 | A1 | 8/2018 | Bania et al. |
| 2018/0351912 | A1 | 12/2018 | Sengupta et al. |
| 2019/0034454 | A1 | 1/2019 | Gangumalla et al. |
| 2019/0036956 | A1 | 1/2019 | Gunda et al. |
| 2019/0149525 | A1 | 5/2019 | Gunda et al. |
| 2019/0235934 | A1 | 8/2019 | Chanda et al. |
| 2019/0238429 | A1 | 8/2019 | Chanda et al. |
| 2019/0266004 | A1 | 8/2019 | Kumar et al. |
| 2019/0394302 | A1 | 12/2019 | Kristiansson et al. |
| 2020/0036608 | A1 | 1/2020 | Chanda et al. |

FOREIGN PATENT DOCUMENTS

| | | |
|---|---|---|
| WO | 2013074828 A1 | 5/2013 |
| WO | 2014126574 A1 | 8/2014 |
| WO | 2018044352 A1 | 3/2018 |
| WO | 2018106612 A1 | 6/2018 |
| WO | 2018118465 A1 | 6/2018 |

OTHER PUBLICATIONS

Author Unknown, "Enabling Service Chaining on Cisco Nexus 1000V Series," Month Unknown, 2012, 25 pages, CISCO.

Author Unknown, "Next-Generation Firewalls," Month Unknown 2013, 1 page, Palo Alto Networks.

Basak, Debashis, et al., "Virtualizing Networking and Security in the Cloud," Month Unknown 2010, 9 pages, VMware, Inc., Palo Alto, CA.

Brownlee, N., et al., "Traffic Flow Measurement: Architecture," RFC 2722, Oct. 1999, 48 pages, The Internet Society.

Casado, Martin, et al., "SANE: A Protection Architecture for Enterprise Networks," Proceedings of the 15th USENIX Security Symposium, Jul. 31-Aug. 4, 2006, 15 pages, USENIX, Vancouver, Canada.

Deri, Luca, et al., "nDPI: Open-Source High-Speed Deep Packet Inspection," 2014 International Wireless Communications and Mobile Computing Conference (IWCMC), Aug. 4-8, 2014, 6 pages, IEEE, Nicosia, Cyprus.

Dixon, Colin, et al., "An End to the Middle," Proceedings of the 12th Conference on Hot Topics in Operating Systems, May 2009, 5 pages, USENIX Association, Berkeley, CA, USA.

Dumitriu, Dan Mihai, et al., (U.S. Appl. No. 61/514,990), filed Aug. 4, 2011, 31 pages.

Flegkas, Paris, et al., "On Policy-Based Extensible Hierarchical Network Management in QoS-Enabled IP Networks," Policy '01 Proceedings of the International Workshop on Policies for Distributed Systems and Networks, Jan. 29-31, 2011, 17 pages, Springer-Verlag, London, UK.

Guichard, J., et al., "Network Service Chaining Problem Statement," Network Working Group, Jun. 13, 2013, 14 pages, Cisco Systems, Inc.

Ioannidis, Sotiris, et al., "Implementing a Distributed Firewall," CCS '00, Month Unknown 2000, 10 pages, ACM, Athens, Greece.

Joseph, Dilip Anthony, et al., "A Policy-aware Switching Layer for Data Centers," Jun. 24, 2008, 26 pages, Electrical Engineering and Computer Sciences, University of California, Berkeley, CA, USA.

Moshref, Masoud, et al., "vCRIB: Virtualized Rule Management in the Cloud," HotCloud '12, Jun. 12-13, 2012, 6 pages.

Nance, Kara, et al., "Virtual Machine Introspection: Observation or Interference?," IEEE Security and Privacy, Sep. 1, 2008, 6 pages, vol. 6, No. 5, IEEE Service Center, Los Alamitos, CA, US.

Rubino, Roberto D., "An Open System for Transparent Firewall Authentication and User Traffic Identification within Corporate Intranets," SIGITE '08, Oct. 16-18, 2008, 5 pages, ACM, Cincinnati, OH, USA.

Scarfone, Karen, et al., "Guidelines on Firewalls and Firewall Policy: Recommendations of the National Institute of Standards and Technology," Special Publication 800-41, Revision 1, Sep. 2009, 48 pages, NIST, U.S. Department of Commerce.

Schulz-Zander, Julius, et al., "Realizing Software-Defined Wireless Networks: Acheiving Fine-Grained Wi-Fi Programmability with Off-the-Shelf Hardware," Apr. 20, 2016, 126 pages.

Sekar, Vyas, et al., "Design and Implementation of a Consolidated Middlebox Architecture," 9th USENIX Symposium on Networked Systems Design and Implementation, Apr. 25-27, 2012, 14 pages, USENIX, San Jose, CA, USA.

Sherry, Justine, et al., "Making Middleboxes Someone Else's Problem: Network Processing as a Cloud Service," In Proc. of SIGCOMM '12, Aug. 13-17, 2012, 12 pages, Helsinki, Finland.

Stojanovski, Nenad, et al., "Analysis of Identity Based Firewall Systems," Jun. 2010, 9 pages.

Stojanovski, Nenad, et al., "Architecture of a Identity Based Firewall System," Jul. 2011, 9 pages.

Johnson, Maritza L., et al., "Laissez-faire File Sharing: Access Control Designed for Individuals at the Endpoints," NSPW '09: Proceedings of the 2009 Workshop on New Security Paradigms Workshop, Sep. 8-11, 2009, 9 pages, ACM, Oxford, United Kingdom.

* cited by examiner

ISOLATED NETWORK STACK TO MANAGE SECURITY FOR VIRTUAL MACHINES

BACKGROUND

As networks expand, it becomes increasingly difficult to manage and maintain network policies for the different machines of the network. Various security applications are used to provide security for a network, including firewalls, antivirus and malware detection, etc.

In virtualized networks in particular, security and authorization for network requests to and from the guest machines becomes increasingly complex and difficult. Virtual hosting networks often have multiple entry points to the network, increasing the need for security and authorization at each of the end machines. In addition, security policies have become increasingly complex, allowing an administrator to make security policy decisions based on context information (e.g., application and/or user information, etc.) and connection information (e.g., source/destination addresses, etc.).

One of the challenges in today's hosting system networks is providing efficient and secure context-based authorization for network requests of virtual machines operating on host machines in a network. In some cases, the end machines may become compromised and cannot be fully trusted to maintain the security of the network. In other cases, network request packets may be modified as they are processed through the end machines, and attempts to apply security policies to the network request packets may fail when the packets change before or after the security decision is attempted.

BRIEF SUMMARY

Some embodiments provide a novel method for providing security services at a local machine with a local network stack using a separate secure network stack to communicate security data with a security engine. The method of some embodiments is performed by a security agent operating in a local machine. In some embodiments, the method identifies a security request (e.g., based on file events, network events, local machine events, etc.) to send to the security engine. The method processes the security request through the secure network stack of the security agent to generate a network packet for the security engine and sends the generated network packet to the security engine.

In some embodiments, the secure network stack is instantiated prior to the instantiation of the local network stack to ensure that the local machine does not corrupt the secure network stack or otherwise attack the network before the security agent is able to secure the local machine.

In some embodiments, the local machine and the security engine operate on a single physical host machine. For example, in some embodiments the local machine is one of several guest virtual machines (VMs) operating on the host machine, and the security engine is a set of security VMs (SVMs) that provides various security services for the guest VMs.

The security agent of some embodiments is provided at several guest machines in the network, with each security agent providing a secondary secure network stack, separate from the network stack used by the guest machine. In some such embodiments, each secure network stack is configured to use a same link-local address to reach the security engine when the secure network stack is instantiated. This allows the security agents to communicate with the security engine in a configuration-less deployment of security agents throughout a network. In some embodiments, the secure network stack is a smaller network stack that supports fewer protocols than the local network stack to allow for quick deployment and activation of the security agent.

In some embodiments, the secure network stack and the local network stack are each associated with a different address (e.g., Internet protocol (IP) address, media access control (MAC) address, etc.), and configured to process network traffic (or packets) associated with different addresses. In addition, in some embodiments the secure network stack and the local network stack each operate on network traffic received at different interfaces of the local machine.

In other embodiments, both network stacks receive traffic for the different addresses associated with the agent and local network stacks at a single interface (e.g., through IP aliasing). The security agent of some such embodiments intercepts network traffic through the interface and determines whether incoming network traffic is addressed to an address associated with the secure network stack (i.e., a security response from the security engine) or the local network stack (i.e., regular network traffic for the local machine). In some embodiments, for network traffic addressed to the guest machine (i.e., the local network stack) the security agent also determines whether the receipt of the incoming packet triggers a security event.

Once the method has received a security response to a security request from the security engine, the method of some embodiments processes the received security response to perform an appropriate security action for the security request. In some embodiments, the security actions for a particular security request include one or more of associating a security tag with the local machine, dropping a set of network packets associated with the particular security request, quarantining a set of files associated with the particular security request, blocking network packets between the local machine and a set of machines associated with the particular security request, modifying a set of QoS policies for network packets associated with the particular security request, etc.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION OF THE INVENTION

Figure 1:
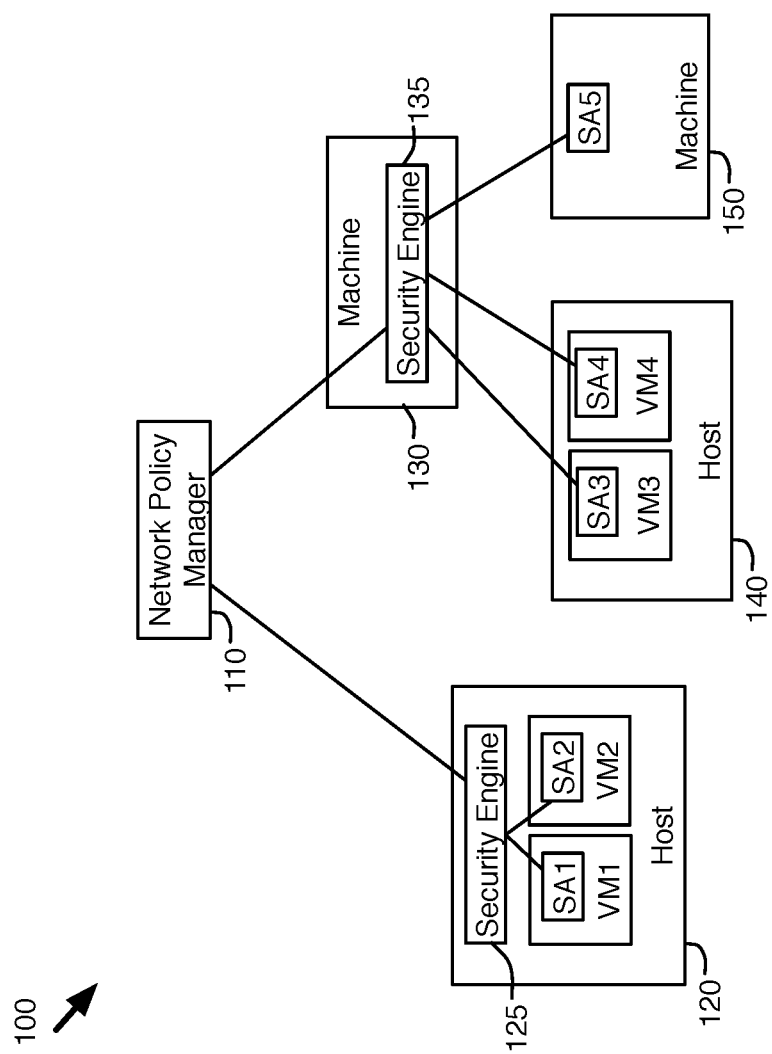
FIG. 1 illustrates an example of a security system that uses external secured security engines to enforce security policies for various machines in a network.

In the following detailed description of the invention, numerous details, examples, and embodiments of the invention are set forth and described. However, it should be understood that the invention is not limited to the embodiments set forth and that the invention may be practiced without some of the specific details and examples discussed.

Some embodiments provide a novel method for providing security services at a local machine with a local network stack using a separate secure network stack to communicate security data with a security engine. The method of some embodiments is performed by a security agent operating in a local machine. In some embodiments, the method identifies a security request (e.g., based on file events, network events, local machine events, etc.) to send to the security engine. The method processes the security request through the secure network stack of the security agent to generate a network packet for the security engine and sends the generated network packet to the security engine.

In some embodiments, the secure network stack is instantiated prior to the instantiation of the local network stack to ensure that the local machine does not corrupt the secure network stack or otherwise attack the network before the security agent is able to secure the local machine.

In some embodiments, the local machine and the security engine operate on a single physical host machine. For example, in some embodiments the local machine is one of several guest virtual machines (VMs) operating on the host machine, and the security engine is a set of security VMs (SVMs) that provides various security services for the guest VMs.

The security agent of some embodiments is provided at several guest machines in the network, with each security agent providing a secondary secure network stack, separate from the network stack used by the guest machine. In some such embodiments, each secure network stack is configured to use a same link-local address to reach the security engine when the secure network stack is instantiated. This allows the security agents to communicate with the security engine in a configuration-less deployment of security agents throughout a network. In some embodiments, the secure network stack is a smaller network stack that supports fewer protocols than the local network stack to allow for quick deployment and activation of the security agent.

In some embodiments, the secure network stack and the local network stack are each associated with a different address (e.g., Internet protocol (IP) address, media access control (MAC) address, etc.), and configured to process network traffic (or packets) associated with different addresses. In addition, in some embodiments the secure network stack and the local network stack each operate on network traffic received at different interfaces of the local machine.

In other embodiments, both network stacks receive traffic for the different addresses associated with the agent and local network stacks at a single interface (e.g., through IP aliasing). The security agent of some such embodiments intercepts network traffic through the interface and determines whether incoming network traffic is addressed to an address associated with the secure network stack (i.e., a security response from the security engine) or the local network stack (i.e., regular network traffic for the local machine). In some embodiments, for network traffic addressed to the guest machine (i.e., the local network stack) the security agent also determines whether the receipt of the incoming packet triggers a security event.

Once the method has received a security response to a security request from the security engine, the method of some embodiments processes the received security response to perform an appropriate security action for the security request. In some embodiments, the security actions for a particular security request include one or more of associating a security tag with the local machine, dropping a set of network packets associated with the particular security request, quarantining a set of files associated with the particular security request, blocking network packets between the local machine and a set of machines associated with the particular security request, modifying a set of QoS policies for network packets associated with the particular security request, etc.

An overview of a distributed network security system and a process for enforcing security policies at distributed security agents using an isolated, secure network stack has been described above. Further details and examples of the security system are described below. Specifically, Section I describes a distributed network security system for enforcing security policies using a security engine and a group of distributed security agents with secure network stacks that operate on machines in the network. Section II describes the process and different examples of communicating with security engines using isolated, secure network stacks in the distributed network security system. Finally, Section III describes an electronic system with which some embodiments of the invention are implemented.

I. Distributed Network Security System

FIG. 1 illustrates an example of a security system that uses secured security engines to enforce security policies for various machines in a network. In some embodiments, a distributed network security system is used to provide security services at various vulnerable points in a network. The distributed network security system of some embodiments uses security agents to detect events at various machines, along with a set of security engines to make the security decisions for the security agents. In some embodiments, each security engine makes security decisions for a particular group of security agents (e.g., all agents operating on a particular host machine). The example of this figure shows a network 100 with a network policy manager 110, security engines 125 and 135, and security agents SA1-SA5.

The network policy manager 110 is for managing a set of security engines, which make security decisions to enforce network security policies for end machines in a network. In some embodiments, a network administrator uses the network policy manager 110 to define the network security policies. The network policy manager 110 of some embodiments prepares network security policy information (e.g., firewall rules, virus definitions, etc.) based on the defined network security policies and distributes the security policy information to the security engines 125 and 135 in the network. In some embodiments, the security engines 125 and 135 use the security policy information to make decisions on security requests from the security agents operating on the end machines.

In some embodiments, the network policy manager 110 operates on a centralized network policy management server, separate from the security engines and security agents. In other embodiments, the centralized network policy manager 110 shares a physical server with the security engines and/or agents of the network.

Security engines of some embodiments use the security policy information received from the network policy manager to handle security requests from security agents operating at various end (or guest) machines (e.g., VMs, containers, servers, laptops, mobile devices, etc.) in the network. Security engines of different embodiments are used for various security functions (e.g., firewall, antivirus, etc.) and operate in a variety of environments. For example, in some embodiments the security engines operate on separate physical machines from the machines that they manage, while in other cases, the security engines operate on the same physical host machine, but in a separate space (e.g., a VM, container, hypervisor module, etc.) from the end (or guest) machines.

Host machines of some embodiments execute virtualization software (e.g., hypervisors, etc.) that allow multiple virtual machines (VMs) to execute on virtualized hardware provided by the virtualization software. The virtualization software can be native or hosted, and allows multiple concurrent instances of operating systems on the computer hardware resources of the host machine. The separation of the security engines from the end machines that they manage, either physically or virtually, provides an additional layer of protection from corruption by the end machines.

In the example of this figure, security engine 125 operates in an isolated, secure space (e.g., a container, a VM, a module within the hypervisor, etc.) on a host machine 120. Host machine 120 also executes guest virtual machines (VMs) VM1 and VM2 along with the security engine 125, which provides security for all the virtual machines VM1-VM2 on the host machine 120. In some embodiments, the security engine 125 for host machine 120 represents a set of security virtual machines (SVMs) that operate on the host machine 120 to provide various security services (e.g., firewall, antivirus, etc.) for the guest VMs VM1 and VM2.

Security engine 135 operates on a separate, dedicated physical machine 130. Security engine 135 is a dedicated security appliance (e.g., a server or other hardware device), which receives network security requests from security agents operating on both virtual machines VM3 and VM4, as well as a physical machine 150. Security engine 135, unlike security engine 125, operates on a separate physical machine from the security agents for which it provides security services.

The security engines 125 and 135 use the rules and settings received from the network policy manager 110 to enforce the security policies of the network. In some embodiments, the security agents SA1-SA5 make security requests based on events (e.g., file events, system events, network events, etc.) detected at the end machines. For example, in some cases, the security engines 125 and 135 are used to authorize network connection requests of the VMs based on the identity of a user and/or application that makes the request and on other information associated with the request (e.g., source/destination addresses, ports, protocols, etc.).

The security engines 125 and 135 then respond with a security decision and/or action (e.g., allow, deny, quarantine, restrict, etc.) for the security requests based on the rules and settings received from the network policy manager 110. In some embodiments, the security engines 125 and 135 also configures settings (e.g., QoS settings, forwarding rules, tunneling configurations, etc.) for an associated forwarding element to enforce the security policies.

In some environments, each end machine is secured against virus/malware using a security agent (or thin agent) that operates within the end machine. Security agents for the end machines monitor events at the end machine and communicate with a corresponding security engine to detect and authorize various security events (e.g., new files, network traffic, etc.) of the end machines. In some embodiments, the security agent is a thin agent (e.g., Transport Driver Interface (TDI), Windows Filtering Platform (WFP), Netfilter, Winsock, etc.) that operates within the operating system of the end machines. In some embodiments, the security agent operates in a secured memory of the various end machines that cannot be readily modified by processes operating in the end machines. The secured memory of some embodiments is monitored against tampering by other processes operating in the end machines.

In some embodiments, the security engines 125 and 135 are third party applications or appliances that communicate with the security agents through a standardized interface (e.g., application programming interface (API), standard network protocols, etc.). The standardized communication protocol allows the security agents to communicate security requests regarding system events (e.g., file changes, new network traffic, system settings changes, etc.) of the monitored end machines to the security engines. In some embodiments, the security agents send the security requests to the security engines as a set of security packets, generated through an isolated, secure network stack of the security agent.

Figure 2:
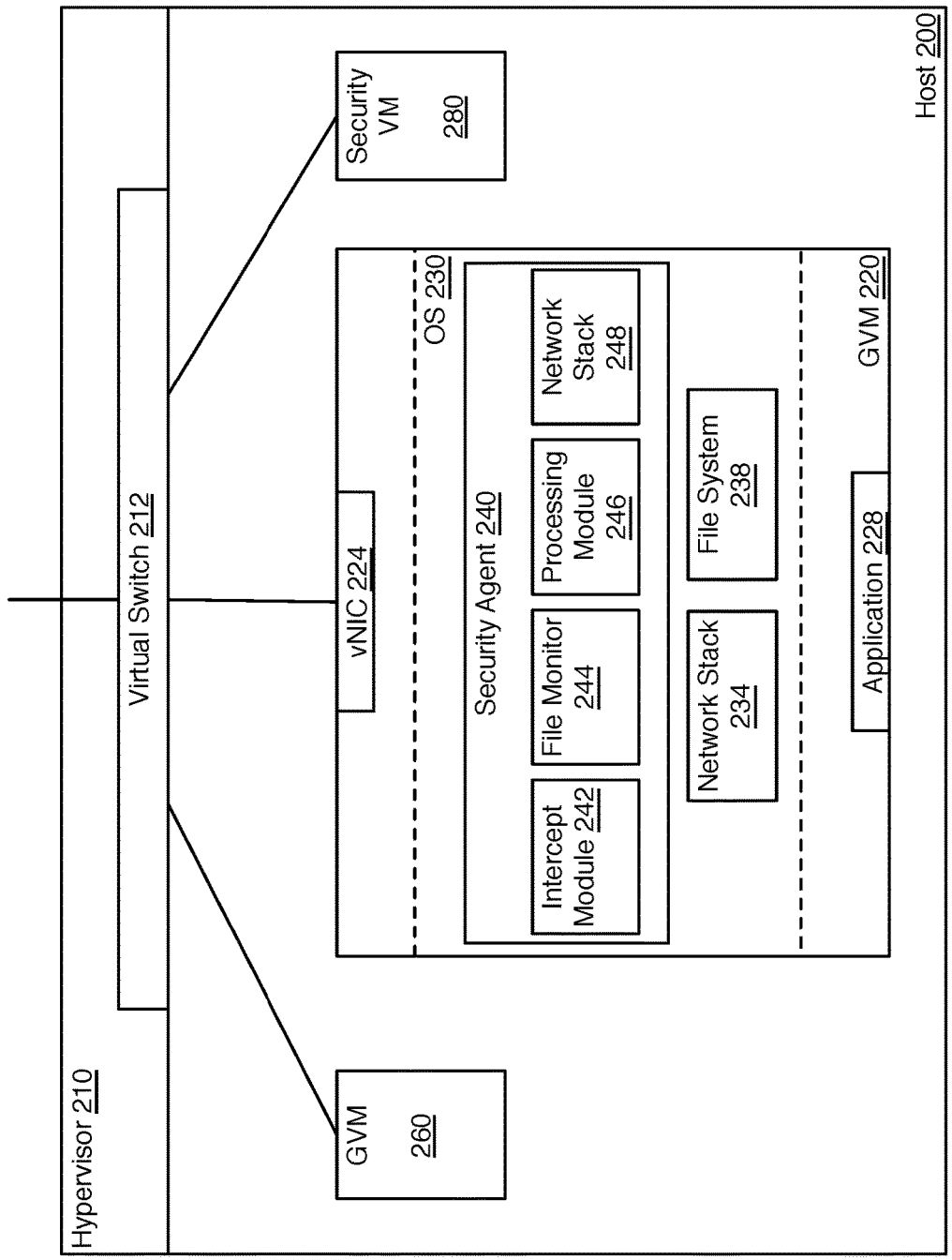
FIG. 2 illustrates an example architecture of a host machine in a network.

As described above, in some embodiments, the security engine and security agents operate on VMs of a physical host machine. FIG. 2 illustrates an example architecture of a host machine (like host 120 described above in reference to FIG. 1) in a network. The host machine 200 includes a security VM (SVM) 220 and guest virtual machines (gVMs) 220 and 260, which operate on a hypervisor 210 of the host machine 200.

The hypervisor 210 is a virtualization software layer that executes on the host machine. The hypervisor 210 provides virtualized access to hardware of the host machine 200 (e.g., a virtual storage device, a virtual network interface card (vNIC), virtual memory, a virtual processor, etc.) for a set of VMs that operate on the hypervisor 210.

In some embodiments, the hypervisor 210 includes a virtual switch 212 for transmitting network traffic of the various VMs operating on the host machine 200. The virtual switch 212 of some embodiments is an emulated switching element that executes in the hypervisor 210 and routes network communications between VMs executing on the host machine 200 or to other end machines in the network.

In some embodiments, the host machine 200 is one of many host machines in a datacenter, or across multiple datacenters, with guest VMs for multiple tenants and/or logical networks. This example shows guest VMs 220 and 260. The different guest VMs of a host may include guest VMs that communicate with each other or may include VMs for different tenants that remain logically isolated from each other. In some embodiments, different security policies are defined for each of the guest VMs 220 and 260.

Guest VMs in a datacenter are vulnerable to attack and can become compromised, so it is desirable to enforce security separate from the operation of the guest VMs. In addition, providing security services separately for each guest VM (e.g., as a service operating on the guest OS) would needlessly consume excessive amounts of processing resources for each host machine 200. Accordingly, the guest VMs 220 and 260 may be configured to use security VM 280 to make security decisions.

In some embodiments, SVM 280 represents one of many SVMs that operate on the host machine. The SVMs of some embodiments provide various third-party security services (e.g., authorization, encryption, malware detection, antivirus, etc.) for guest machines operating on the host machine 200. The SVMs enforce centralized network security policies (e.g., as defined by an administrator) for all of the guest VMs operating on each host machine. In some embodiments, the SVM 280 makes the security decisions based on the network security policies, and provides a security response to the security agent, which then executes the security response. Alternatively, or conjunctively, the security VM 280 of some embodiments performs other security operations e.g., modifying configurations for a forwarding element, etc. Although this example shows two guest VMs and a single security VM, one skilled in the art will recognize that a host machine may host any number of guest and security VMs.

In this example, guest VM 220 includes a vNIC 224, a guest OS 230, and a guest application 228. Although detailed elements of guest VM 260 are not shown, it should be understood that in some embodiments, some or all of the guest VMs have the same or similar elements as those described for guest VM 220.

The virtualized network interface controller (vNIC) 224 is a virtualization of a physical NIC (not shown) of the host machine 200 provided by hypervisor 210. The vNIC 224 is coupled to a port of virtual switch 212 and allows the guest VM 220 to communicate with other network elements (e.g., other guest VMs, security VMs, etc.).

Guest application 228 operates on guest operating system (OS) 230 of the guest VM 220. The application 228 can be any user application that makes various requests (e.g., network, system, etc.) that are handled by the operating system and monitored by the security agent 240. For example, an application, such as a web browser, may make a network connection request to a server (e.g., at website.com). The security agent 240 monitors the requests, and if approved, OS 230 handles the network requests to make the connections.

Guest OS 230 is an operating system for the guest VM 220. In this example, the guest OS 230 includes guest network stack 234, file system 238, and security agent 240. Operating systems use various interfaces and protocols to handle the network requests of applications. These various interfaces and protocols can be described as a set of layers, with each layer receiving certain inputs, performing particular functions, and generating particular outputs to communicate with the surrounding layers. The Open Systems Interconnection (OSI) network model describes various different layers for network communications. The particular combination of protocols and/or interfaces that are used for a particular operation is referred to as a protocol stack (or network stack). Different implementations may combine or separate the functionalities of the different layers of the OSI network model. For example, Transmission Control Protocol/Internet Protocol (TCP/IP) is a commonly used protocol stack that combines the functionalities of some of the layers of the OSI network model. Guest network stack 234 is a network stack provided by guest OS 230 for the guest VM 220. The guest network stack 234 is used to generate and process packets for network communications between the guest VM 220 and other guest VMs (e.g., guest VM 260).

File system 238 represents the files stored on the host machine for the VM. The file system 238 can include user files as well as system files, which can be monitored by the security agent 240 to identify changes (e.g., new files, file modifications, etc.) that may affect the security of the virtual machine.

Security agent 240 of some embodiments operates within the OS 230 of a guest VM 220 to provide security services for the guest VM, but in other embodiments, security agent 240 operates in a separate space from the guest OS 230. In some embodiments, security agent 240 monitors the guest VM 220 for various events, communicates with the security VM 280 to determine how to respond to the events, and responds accordingly. In order to provide effective security, the security agent of some embodiments is configured and installed prior to other elements of the guest VM. In this manner, the security agent 240 can be available to make security decisions before the guest VM (or the security agent 240 itself) can be corrupted or attacked.

In this example, security agent 240 includes an intercept module 242, file monitor 244, processing module 246, and secure network stack 248. Intercept module 242 and file monitor 244 are examples of monitoring modules that the security agent security agent 240 of some embodiments uses to monitor various system events (e.g., file changes, incoming/outgoing network traffic, system configurations, etc.) of the guest VM 220. In some embodiments, other modules are included for monitoring other system events (e.g., configuration changes, user logins, etc.)

Intercept module 242 of some embodiments intercepts network requests (e.g., incoming/outgoing network traffic, network responses from a security engine, etc.) to determine whether a security event should be triggered (e.g., for traffic from an untrusted source, unexpected header values, etc.). In some embodiments, intercept module 242 includes an application layer enforcement (ALE) layer that operates to capture incoming network requests before being processed by the network stack 248. In some embodiments, the intercept module 242 filters outgoing network traffic as it traverses the network stack 248. For example, the intercept module 242 of some embodiments is implemented using Microsoft's Windows Filtering Platform (WFP) through network hooks and callbacks that capture and operate on the network requests as it traverses the network stack 248. Similarly, the file monitor 244 of some embodiments monitors (e.g., using Microsoft Window's file system mini-filter framework) file operations (e.g., add, delete, modify, etc.) within an end machine to determine whether a security event should be triggered (e.g., modification of special system files, untrusted executable files, etc.).

When a security event is detected (e.g., by intercept module 242 or file monitor 244), the processing module 246 sends a security request for the detected event to the security VM 280. The security request of some embodiments includes context information (e.g., context, source/destination addresses, ports, protocols, user identification, file contents, metadata, etc.). In some embodiments, the security agents send the security request to the security VM 280 as a set of security packets, generated through an isolated, secure network stack 248.

The security VM 280 then processes the security request based on centralized network security policies defined by an administrator of the network to respond with security decisions (e.g., whether to allow a particular user to make a connection to a particular IP from a particular application) for the security request. Processing module 246 then receives the security decision and executes security operations (e.g., dropping a packet, quarantining a file, modifying system settings, etc.) according to the security decision.

In some embodiments, the security VM 280 can enforce the security decisions outside of the guest VM 220. For example, when providing firewall services, the security engine (e.g., security VM 280) can analyze the context information in a security request for a network event to decide whether to allow or block a packet, and then update firewall rules (e.g., at a managed forwarding element) accordingly. In some embodiments, the security engine receives the actual network packet, decides whether to allow or drop the packet based on the network security policies, and allows or drops the packet directly.

As described above, the security agent 240 needs to communicate security requests and security decisions with the security VM 280. In some implementations, the security agent 240 doesn't have direct connection to the security engine 280, so it delivers the security requests to a host component (e.g., a mux component in hypervisor 210), which then relays the request to the security engine 280. The security agent of some such implementations uses a separate, dedicated channel (e.g., ESX's VMCI channel) on a predefined port to send the security requests to the host component and uses a network connection (e.g., a transmission control protocol (TCP) connection) to communicate with the security engine 280.

Some implementations use the dedicated channel, rather than using the guest network stack 234 to send the security requests directly to the security VM 280, because the dedicated channel is isolated and independent from the guest network stack and available at boot time before the guest network stack 234 is initialized. Another reason for using a separate dedicated channel is that the security agent 240 monitors network operations of guest network stack 234 inside the guest VM 220, but monitoring such network operations would be difficult if the same guest network stack 234 is used for communications for both guest VM 220 and security VM 280, as it can result in recursive calls (e.g., when security requests are made for received security request packets).

Further, as the dedicated channel and the host component are hypervisor-specific, use of a dedicated channel and an intermediary host component requires the use of specific hypervisor platforms and is not easily ported to other hypervisors. Porting this solution to other hypervisors would require finding a similar communication channel and installing the host component within the hypervisor, but even such a solution would not be viable when the hypervisor is inaccessible to the tenant (e.g., in a public cloud such as Amazon cloud services).

Accordingly, some embodiments of the invention provide an isolated, secure network stack 248 within the security agent 240 operating on each of the guest VMs. With both a guest network stack 234 and a secure network stack 248, this approach allows for the different network stacks to use different addresses (e.g., MAC and/or IP addresses) on a network adapter (e.g., a vNIC)—one for secure communication with the SVM 280 and another for the guest VM 220 to communicate with other VMs (e.g., guest VM 260) in the network. Each of the network stacks can be configured differently (e.g., with different default gateways, memory heaps, address resolution protocol (ARP) and routing tables, etc.). In addition, with an isolated, secure network stack 248, even if the guest VM 220 is compromised, it can only use the guest network stack 234 to infect other VMs. The malicious user/app can't easily exploit the secure network stack 248 to access the SVM 280.

In some embodiments, network traffic for the guest network stack 234 and the secure network stack 248 are received on a single interface. The interface is associated with separate addresses (e.g., through IP aliasing) for the guest network stack 234 and the secure network stack 248, and receives traffic addressed to both network stacks. The intercept module 242 of the security agent 240 of some such embodiments, captures the network traffic and determines which network stack to use to process the traffic based on a destination address associated with the network traffic. In order to prevent a corrupted guest machine from communicating with the security VMs, the intercept module 242 of some embodiments specifically drops any outgoing packets from the guest VM that try to reach the address associated with the security engine.

In some embodiments, the guest network stack 234 and the secure network stack 248 use separate interfaces. In some cases, a cloud service provider provides a separate, hidden TCP channel can be used to manage and stream the guest VM screen to a tenant. The guest VMs hosted on the host machines of the cloud service provider have two interfaces—one for connectivity to other VMs and another for a management interface that is used to manage the guest VM and provide screen access to the VM. When both interfaces operate on a single interface, the tenant has to ensure that the management interface is not blocked or disabled by any firewall software operating on the VM, which can deny management access to the VM. By using isolated, secure network stack 248 for the management interface, the guest OS will be completely unaware of the management interface and the address/routing information for the secure network stack 248.

The isolated, secure network stack 248 (e.g., a TCP/IP stack) of some embodiments is built with a thin agent driver that is initiated before the guest network stack 234 is initialized. To facilitate the quick initiation of the secure stack 248 and to minimize the effects on performance for the guest VM 220, the secure network stack 248 of some embodiments will have only the minimal functionality to establish a network connection to the SVM 280. In some embodiments, the isolated secure network stack will only have implementations of the Internet protocol (IP), transmission control protocol (TCP), user datagram protocol (UDP), and dynamic host configuration (DHCP) protocol as per the RFC standard, making the network stack smaller than the guest network stack 234 which supports a wide range of protocols.

The security agent 260 with a secure network stack 248 of some embodiments can be installed to communicate with the security VM 280 with little to no configuration by predefining the secure network stack 248 to connect to a link local IP address associated with the security VM 280. For example, the secure network stack 248 can be hard coded to connect to a link local IP address 169.254.1.24 at port 48655 associated with VM 280. If the security VM 280 is configured to run on this address, it can be directly accessed from the guest VM 220, regardless of the hypervisor and public cloud environments, without needing any configuration on the guest.

II. Security Agents with Secure Network Stacks

Figure 3:
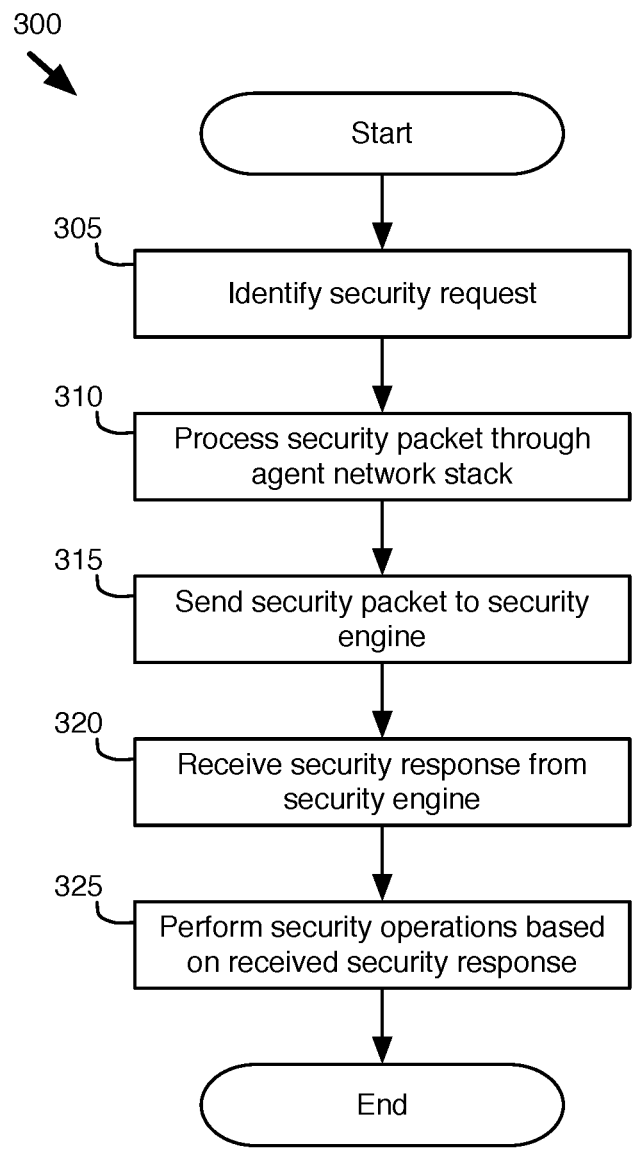
FIG. 3 conceptually illustrates a process for monitoring a machine and enforcing security at the machine.

FIG. 3 conceptually illustrates a process for monitoring a machine and enforcing security at the machine. The process 300 identifies (at 305) a security request to be made. The security request of some embodiments is based on a system event, such as a change in the system settings, creation of new files, etc. In some embodiments, the security requests are triggered by network events, such as the interception of an incoming and/or outgoing packet by a security agent operating on the machine. The process 300 of some embodiments analyzes the detected events to determine whether a security request is necessary. For example, in some embodiments, files generated by a known application do not trigger security requests, while files generated by an unrecognized source do trigger security requests.

The process 300 then processes (at 310) the security request through the secure network stack to generate security packets, which are then sent (at 315) to a security engine. The security engine of some embodiments is a secured machine (e.g., a security VM) that operates separate from the guest machine, which is used to make security decisions for the various security requests of the guest machines.

The process 300 then receives (at 320) a security response from the security engine. The security response of some embodiments includes instructions or a decision for the particular security request. Such instructions can include a decision to allow or drop a packet, quarantine a file or application, restrict network access of the guest machine, etc. The process 300 then performs the security operations based on the received security response, and the process ends.

Figure 4A:
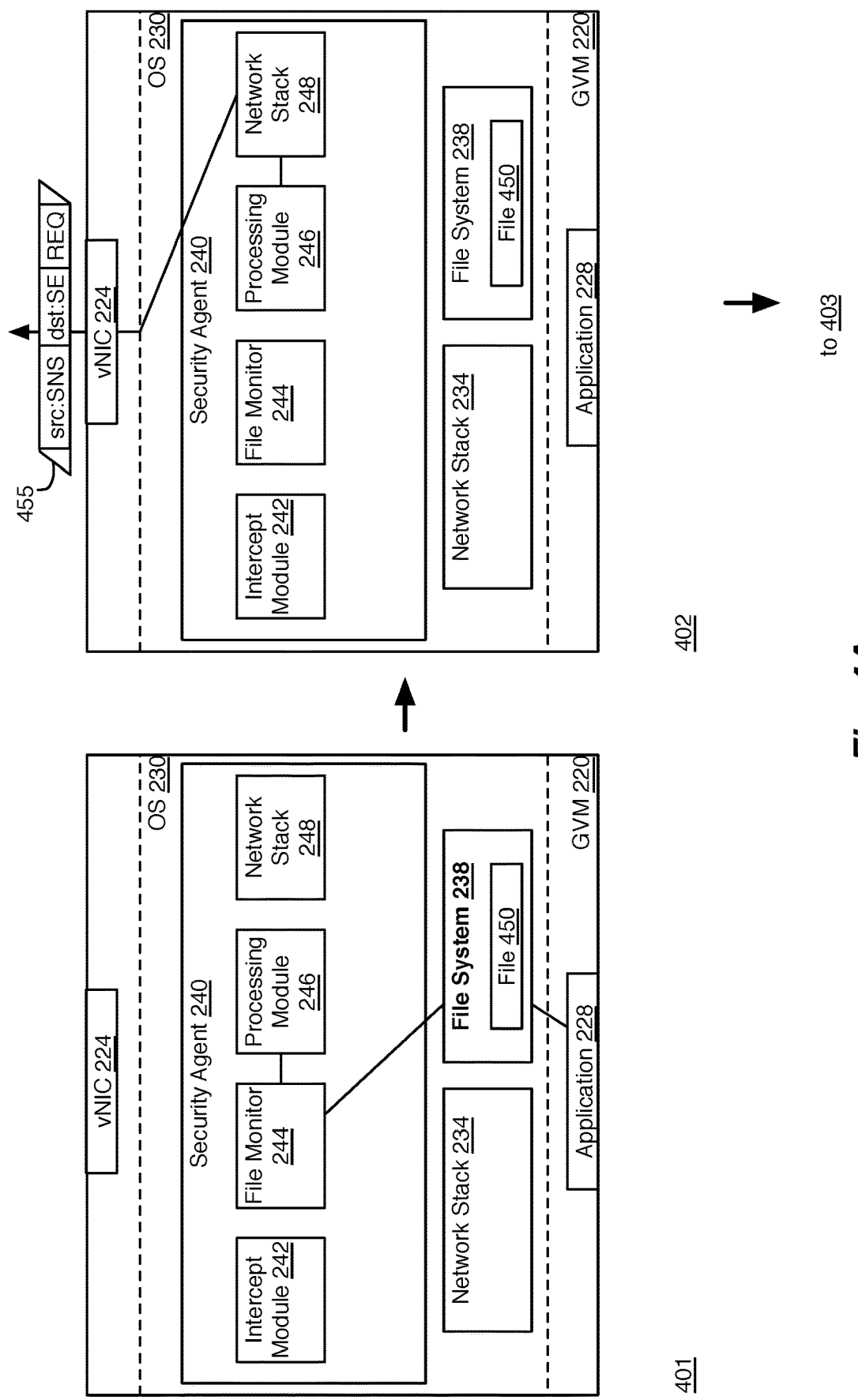
FIGS. 4A-B illustrate an example of handling a file event at a local machine.
Figure 4B:
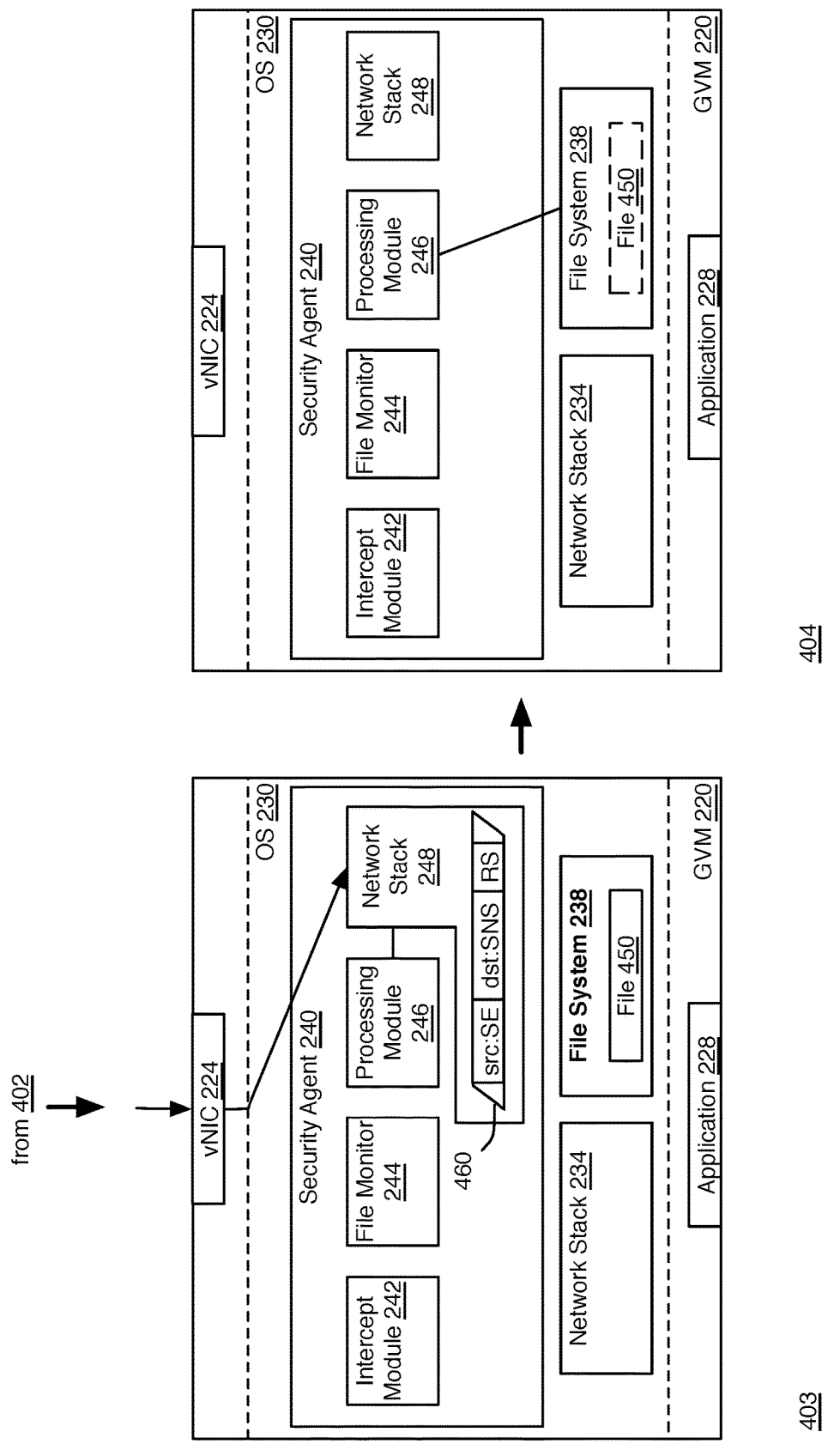

Examples of monitoring and enforcing security for a guest machine are described below with reference to FIGS. 4-6. FIGS. 4A-B illustrate an example of handling a file event at a local machine in four stages 401-404. This example shows a guest VM 220 with an application 228, vNIC 224, and operating system 230, as described above with reference to FIG. 2. The first stage 401 shows that application 228 has created a file 450 in the file system 238. In the first stage, file monitor 244 has detected the change to the file system 238, and notified the processing module 246 of the change. Processing module 246 of some embodiments performs an initial analysis to determine whether the new file 450 should trigger a security request to the security engine.

The second stage 402 shows that processing module 246 has determined that a security request should be sent, and generates a set of packets 450 through the secure network stack 248, which are then sent through vNIC 224. The set of security request packets 455 are sent from an address associated with the secure network stack 248 to an address associated with the security engine. In some embodiments, the address for the security engine is a link-local address that is used for a group of security agents operating on a group of different guest machines.

In the third stage 403, the guest VM 220 receives a response packet 455 from the security engine, through the vNIC 224 and the secure network stack 248. The response packet 460 is processed by the processing module 246 through the secure network stack 248, rather than the guest network stack 234, because of the destination address associated with the response packet. In some embodiments, the intercept module 242 intercepts all packets, whether they are addressed to the guest network stack 234 or the secure network stack 248, and then determines whether to process the packet accordingly. The process for processing network packets by the intercept module is described in further detail below with reference to FIG. 7.

In the fourth stage 404, the processing module 246 performs the security operations associated with the response packet 460 received in the third stage 403. In this example, processing module 246 quarantines (shown with a dashed line) the new file 450 in order to restrict access to the file and prevent it from operating on the guest VM 220.

Figure 5A:
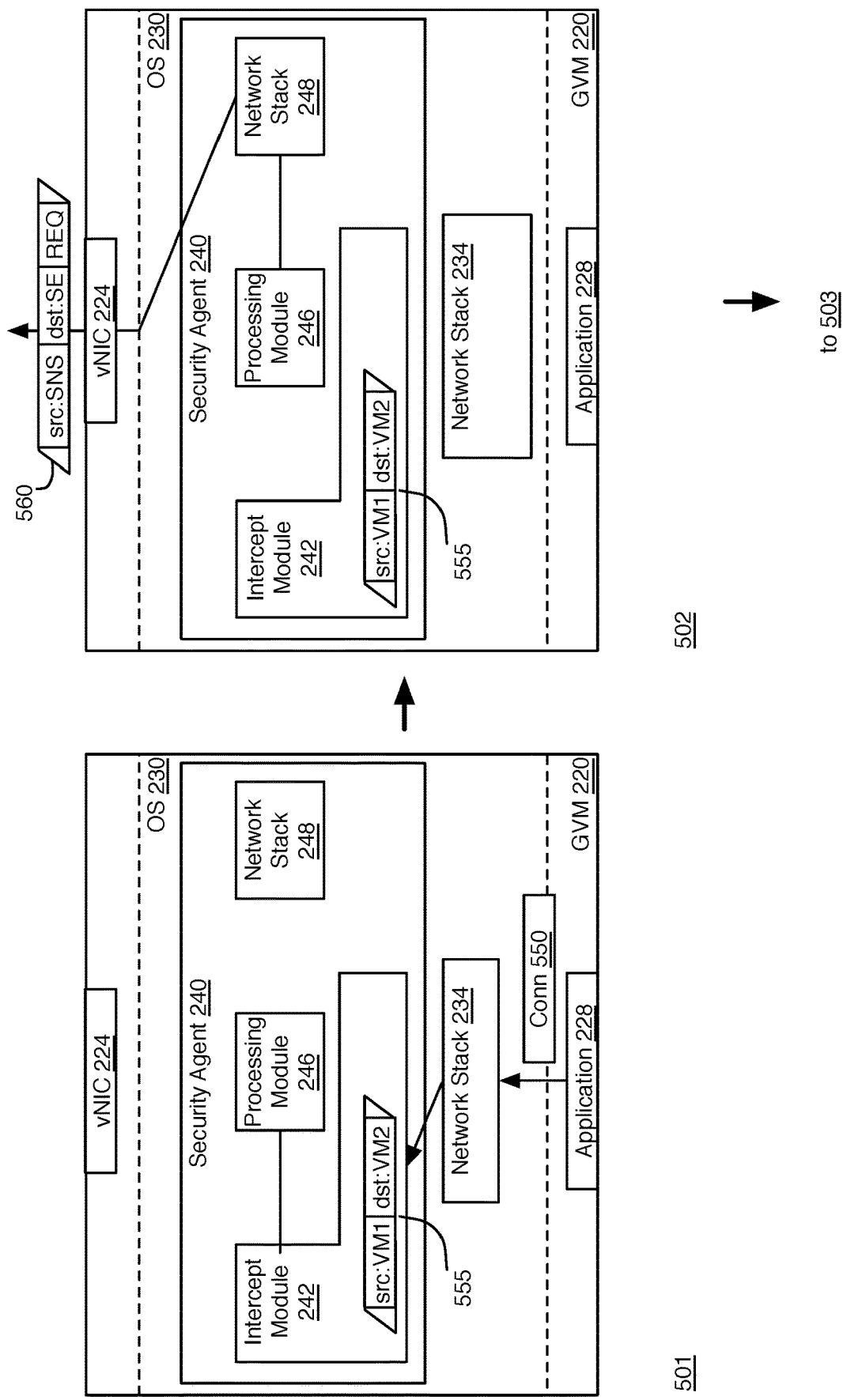
FIGS. 5A-B illustrate an example of handling an outgoing network event at a local machine.
Figure 5B:
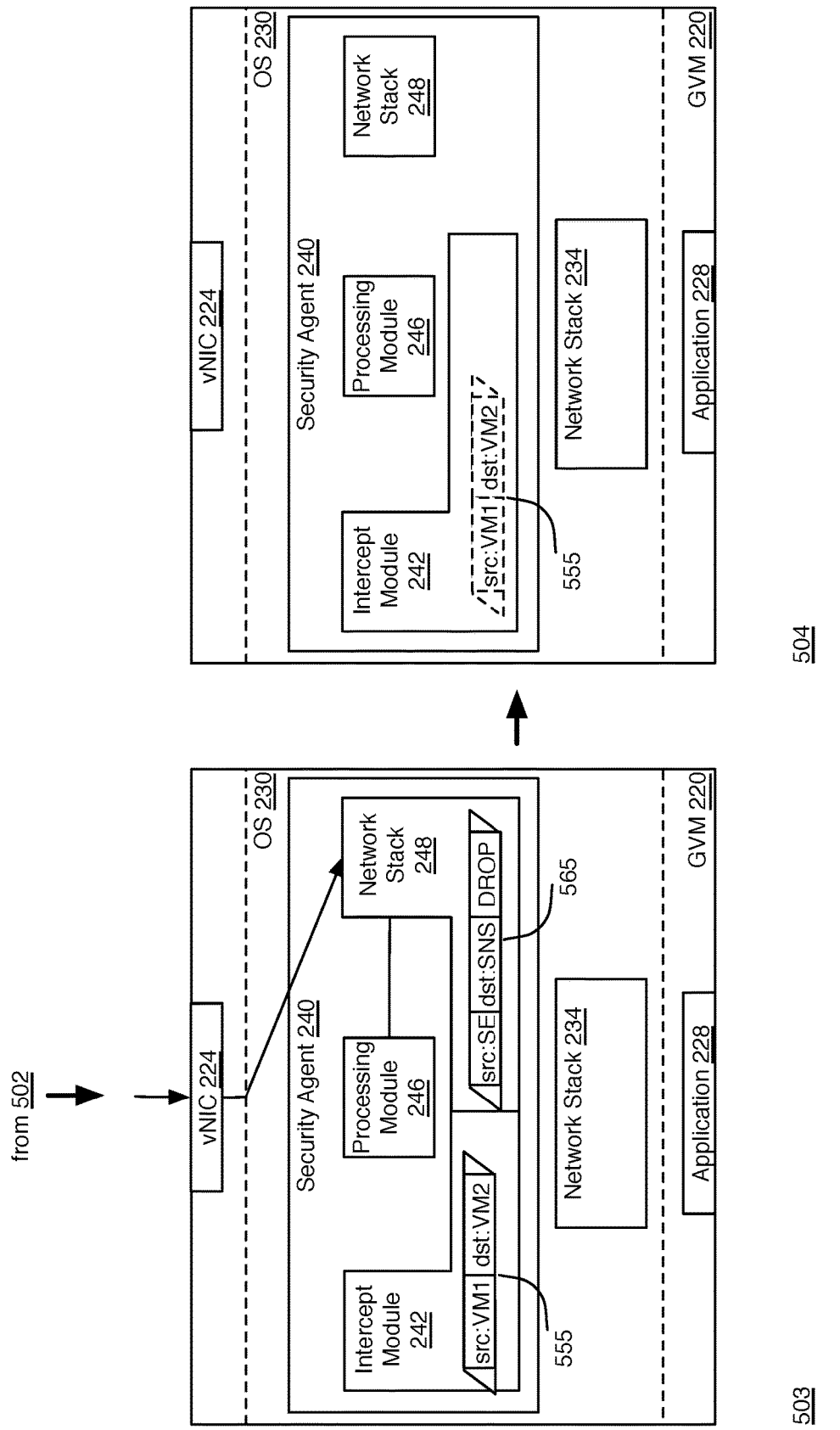

FIGS. 5A-B illustrate an example of handling an outgoing network event at a local machine in four stages 501-504. The first stage 501 shows that application 228 has initiated a network connection request 550, which is processed through the guest network stack 234 to generate packets 550 to initiate the network connection between the application 228 and another application operating on another machine VM2 (not shown). In the first stage 501, intercept module 242 has captured the generated packets 550 and notified the processing module 246 of the change. Processing module 246 of some embodiments performs an initial analysis to determine whether the outgoing packets 555 should trigger a security request to the security engine.

The second stage 502 shows that processing module 246 has determined that a security request should be sent, and generates a set of security request packets 560 through the secure network stack 248, which are then sent through vNIC 224. The set of packets 560 are sent from an address SNS associated with the secure network stack 248 to an address associated with the security engine. In some embodiments, the address for the security engine is a link-local address that is used for a group of security agents operating on a group of different guest machines.

In the third stage 503, the guest VM 220 receives a response packet 565 from the security engine, through the vNIC 224 and the secure network stack 248. The response packet 565 is processed by the processing module 246 through the secure network stack 248, rather than the guest network stack 234, because of the destination address associated with the response packet. In some embodiments, the intercept module 242 intercepts all packets, whether they are addressed to the guest network stack 234 or the secure network stack 248, and then determines whether to process the packet accordingly.

In the fourth stage 504, the processing module 246 performs the security operations associated with the response packet 565 received in the third stage 503. If the response packet 565 had allowed the outgoing packet 555, the packet 555 would be sent through the vNIC 224 toward the destination machine VM2. In this example, however, processing module 246 drops (shown with a dashed line) the outgoing packet 550.

Figure 6A:
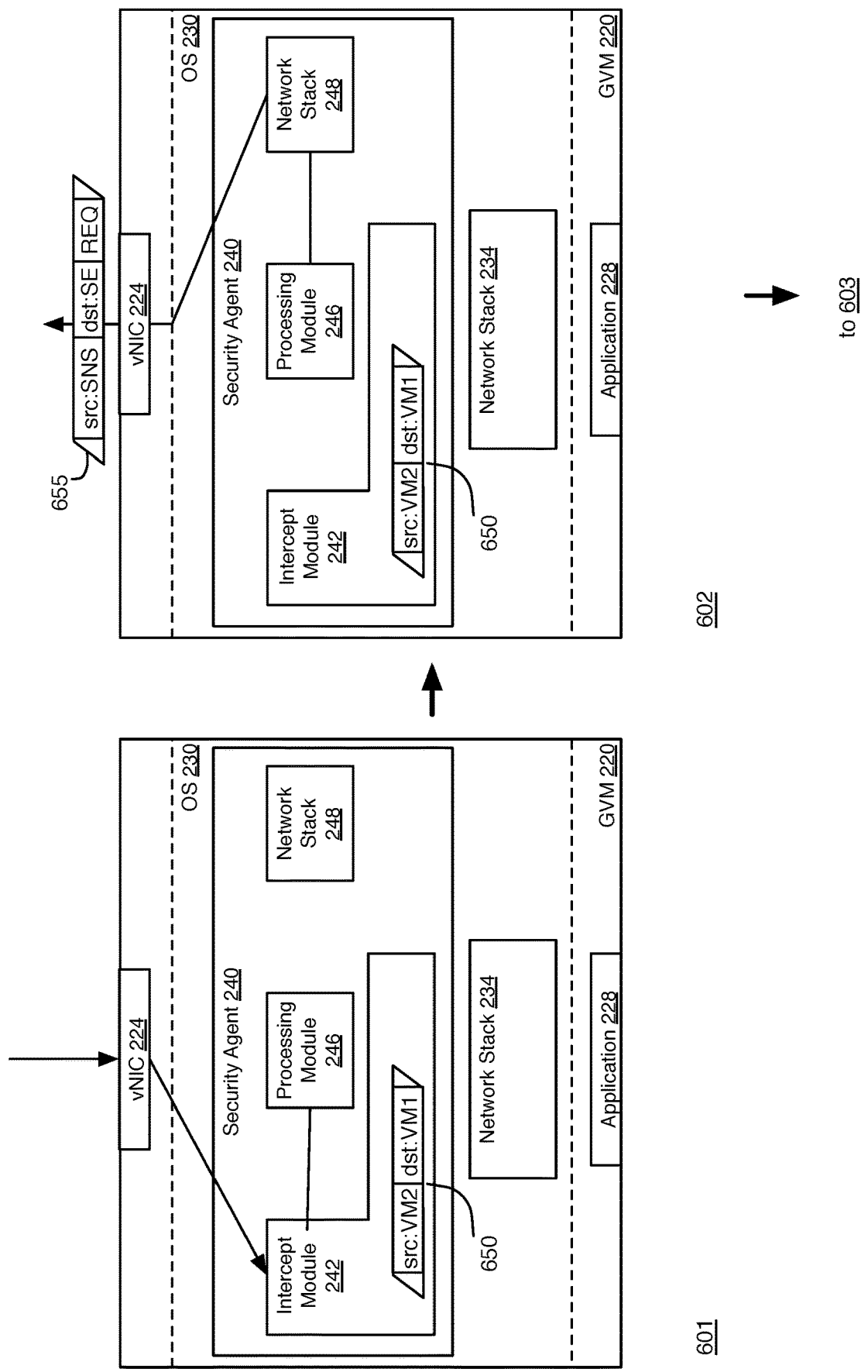
FIGS. 6A-B illustrate an example of handling an incoming network event at a local machine.
Figure 6B:
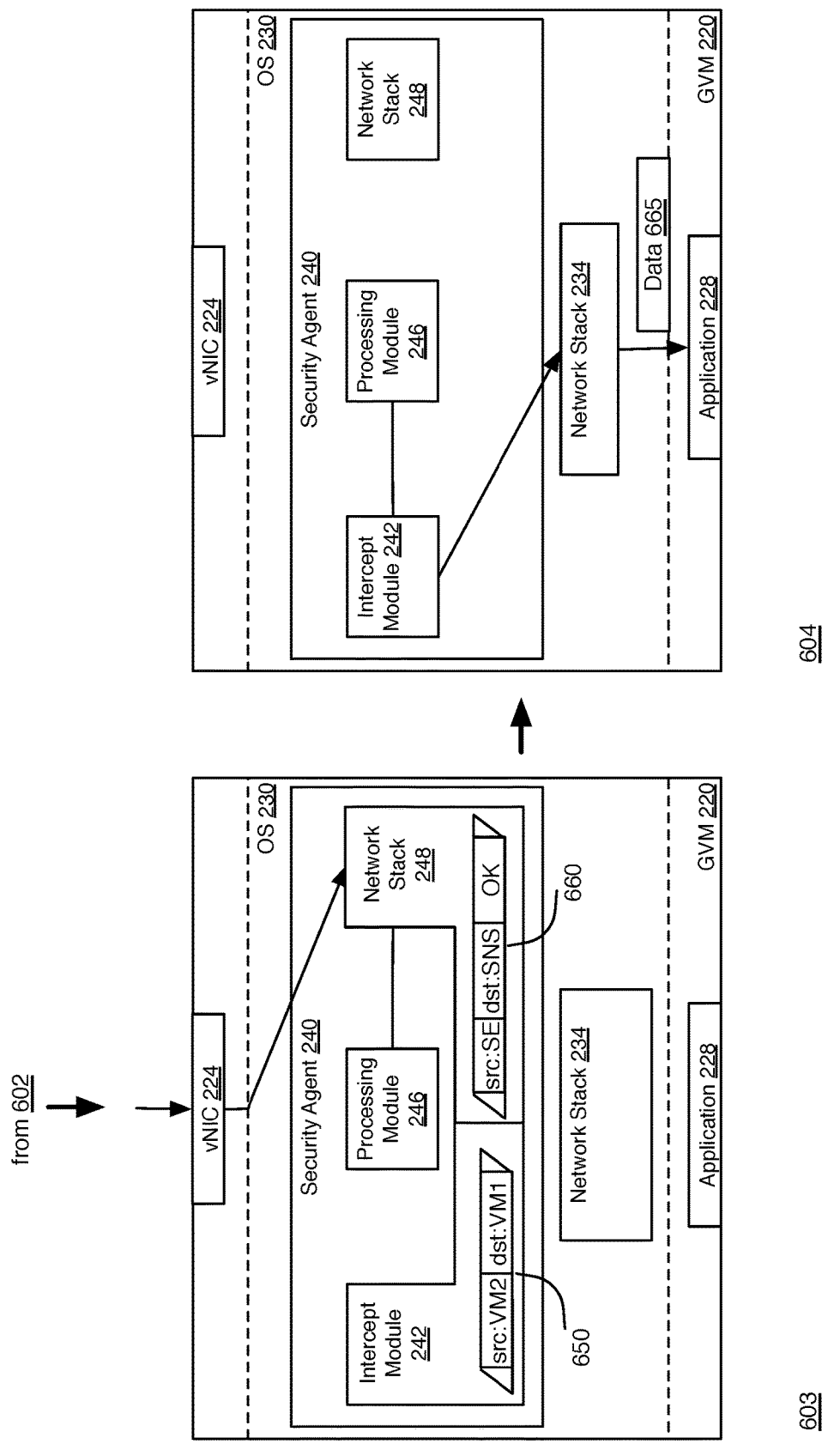

FIGS. 6A-B illustrate an example of handling an incoming network event at a local machine in four stages 601-604. The first stage 601 shows that the intercept module 242 captures an incoming network packet 650. In some embodiments, intercept module 242 determines whether the incoming packet 650 is destined for the guest VM 220 (e.g., an application packet) or for an address associated with the secure network stack 248 (e.g., a security response from a security engine). In this example, the incoming network packet 650 is destined for guest VM 220 with a destination address of VM1, but intercept module 242 captures the incoming packet 650 before it can be processed by the guest network stack 234. The first stage 601 also shows that the processing module 246 analyzes the incoming packet 650 to determine whether the incoming packets 650 should trigger a security request to the security engine. When the incoming packet 650 does not trigger a security request, the incoming packet 650 can be sent to the network stack 234.

The second stage 602 shows that processing module 246 has determined that a security request should be sent, and generates a set of security request packets 655 through the secure network stack 248, which are then sent through vNIC 224. The set of security packets 655 are sent from an address SNS associated with the secure network stack 248 to an address SE associated with the security engine. In some embodiments, the address for the security engine is a link-local address that is used for a group of security agents operating on a group of different guest machines.

In the third stage 603, the guest VM 220 receives a response packet 660 from the security engine, through the vNIC 224, and processes the response packet 660 with the secure network stack 248. As described above, in some embodiments, the response packet 660 is first captured by the intercept module 242 and sent to the secure network stack 248 upon determining that it is addressed to the secure network stack 248.

In the fourth stage 604, the processing module 246 performs the security operations associated with the response packet 660 received in the third stage 603. In this case, the response packet 565 allows the incoming packet 650 and the intercept module 650 sends the packet through the network stack 234 to provide data 665 to the receiving application 228.

Figure 7:
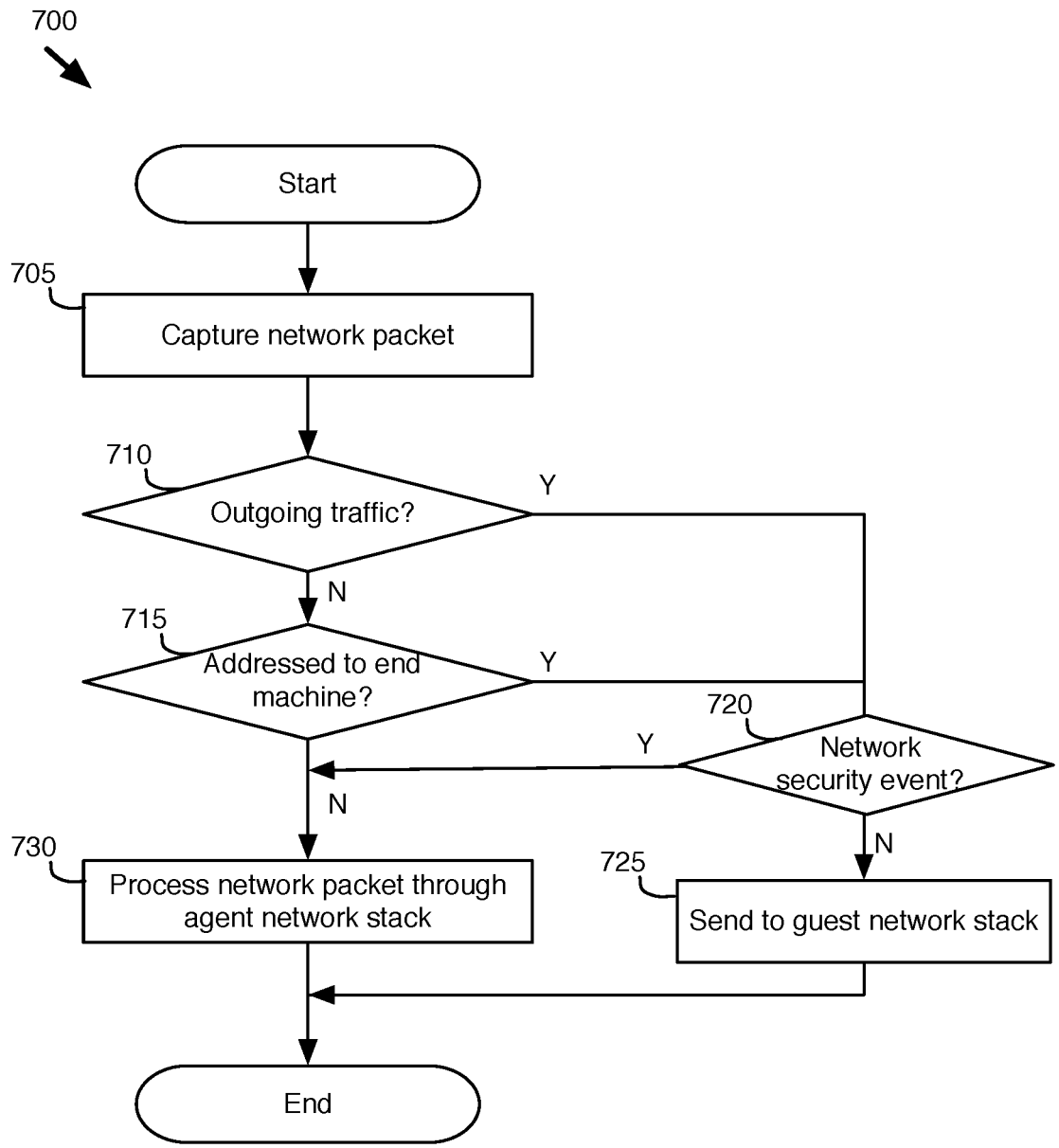
FIG. 7 conceptually illustrates a process for handling network packets at a security agent.

FIG. 7 conceptually illustrates a process for handling network packets at a security agent. The process 700 of some embodiments is performed by a security agent operating on an end machine in a distributed network security system. The process 700 captures (at 705) a network packet. In some embodiments, process 700 captures (at 705) every packet that enters or exits the end machine.

At 710, the process 700 determines whether the captured packet is outgoing traffic that is initiated by the end machine. When the process 700 determines (at 710) that the captured packet is outgoing traffic, the process 700 proceeds to step 720, described below.

When the process 700 determines (at 710) that the traffic is not outgoing traffic (i.e., incoming traffic), the process 700 determines (at 715) whether the captured network packet is addressed to the particular end machine. When the process 700 determines (at 715) that it is addressed to the particular end machine or, at 710, that the packet is for outgoing traffic, the process 700 determines (at 720) whether a network security event is triggered by the captured network packet. For example, in some embodiments, a captured network packet triggers a network security event when it is received from an untrusted domain, when a packet is unexpectedly modified within an end machine, etc.

When the process 700 determines (at 720) that no network security event is triggered, the process sends (at 725) the packet to be processed by the guest network stack of the particular end machine to be sent on to packet's destination.

When the process 700 determines (at 715) that the packet is not addressed to the particular end machine (i.e., is addressed to an address associated with the secure network stack), or that the captured packet has triggered a network security event at step 720, the process 700 processes (at 725) the network packet through the agent's network stack to generate a set of security request packets to be sent to the security engine. The process 700 of some embodiments then performs security operations based on responses to the security request packets, as described above with reference to FIG. 3. The process 700 then ends.

III. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 8:
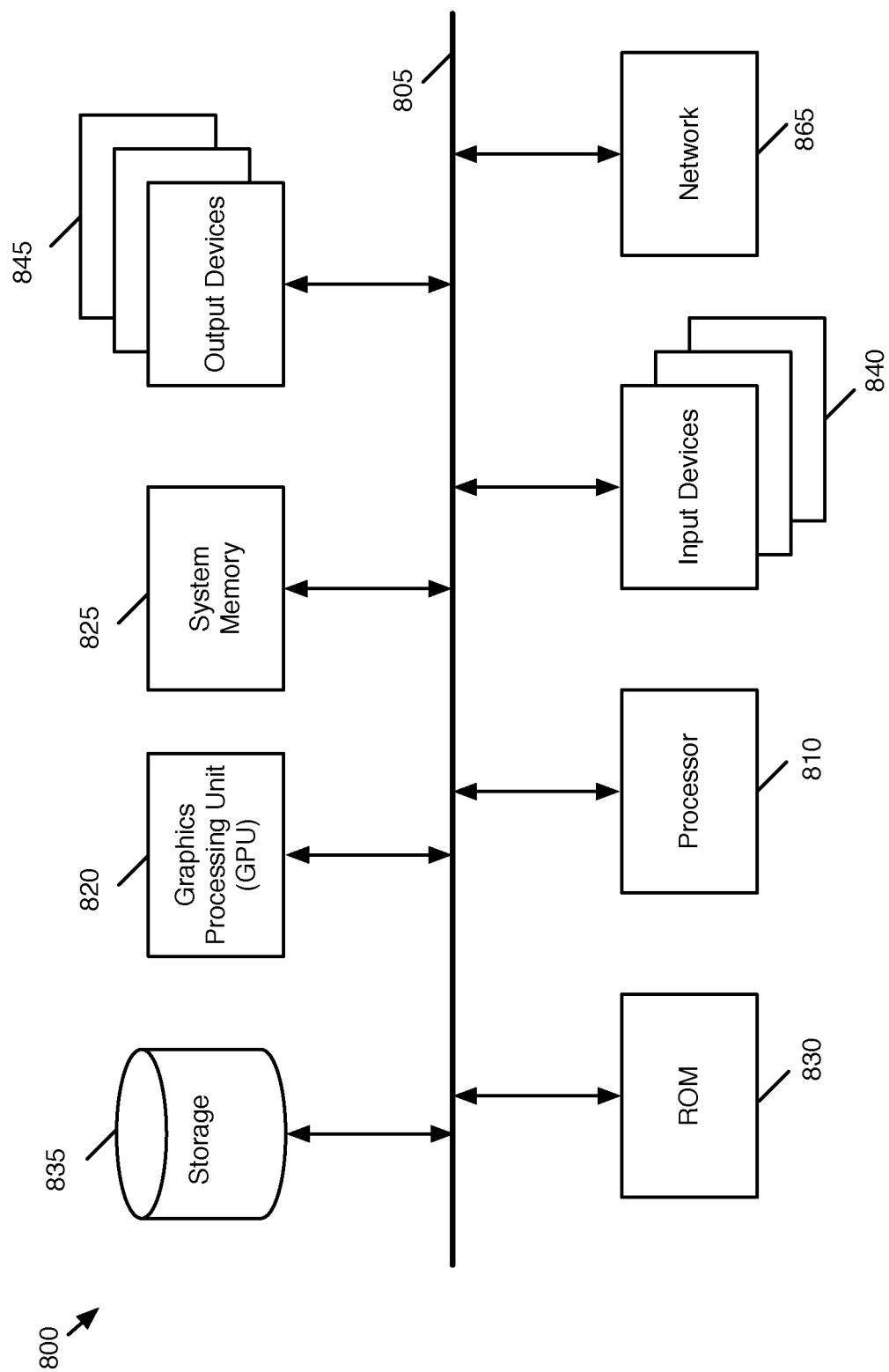
FIG. 8 conceptually illustrates an electronic system with which some embodiments of the invention are implemented.

FIG. 8 conceptually illustrates an electronic system 800 with which some embodiments of the invention are implemented. The electronic system 800 may be a computer (e.g., a desktop computer, personal computer, tablet computer, etc.), server, dedicated switch, phone, PDA, or any other sort of electronic or computing device. Such an electronic system includes various types of computer readable media and interfaces for various other types of computer readable media. Electronic system 800 includes a bus 805, processing unit(s) 810, a system memory 825, a read-only memory 830, a permanent storage device 835, input devices 840, and output devices 845.

The bus 805 collectively represents all system, peripheral, and chipset buses that communicatively connect the numerous internal devices of the electronic system 800. For instance, the bus 805 communicatively connects the processing unit(s) 810 with the read-only memory 830, the system memory 825, and the permanent storage device 835.

From these various memory units, the processing unit(s) 810 retrieves instructions to execute and data to process in order to execute the processes of the invention. The processing unit(s) may be a single processor or a multi-core processor in different embodiments.

The read-only-memory (ROM) 830 stores static data and instructions that are needed by the processing unit(s) 810 and other modules of the electronic system. The permanent storage device 835, on the other hand, is a read-and-write memory device. This device is a non-volatile memory unit that stores instructions and data even when the electronic system 800 is off. Some embodiments of the invention use a mass-storage device (such as a magnetic or optical disk and its corresponding disk drive) as the permanent storage device 835.

Other embodiments use a removable storage device (such as a floppy disk, flash memory device, etc., and its corresponding drive) as the permanent storage device. Like the permanent storage device 835, the system memory 825 is a read-and-write memory device. However, unlike storage device 835, the system memory 825 is a volatile read-and-write memory, such a random access memory. The system memory 825 stores some of the instructions and data that the processor needs at runtime. In some embodiments, the invention's processes are stored in the system memory 825, the permanent storage device 835, and/or the read-only memory 830. From these various memory units, the processing unit(s) 810 retrieves instructions to execute and data to process in order to execute the processes of some embodiments.

The bus 805 also connects to the input and output devices 840 and 845. The input devices 840 enable the user to communicate information and select commands to the electronic system. The input devices 840 include alphanumeric keyboards and pointing devices (also called "cursor control devices"), cameras (e.g., webcams), microphones or similar devices for receiving voice commands, etc. The output devices 845 display images generated by the electronic system or otherwise output data. The output devices 845 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 8, bus 805 also couples electronic system 800 to a network 865 through a network adapter (not shown). In this manner, the computer can be a part of a network of computers (such as a local area network ("LAN"), a wide area network ("WAN"), or an Intranet, or a network of networks, such as the Internet. Any or all components of electronic system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

The term "packet" is used throughout this application to refer to a collection of bits in a particular format sent across a network. It should be understood that the term "packet" may be used herein to refer to various formatted collections of bits that may be sent across a network. A few examples of such formatted collections of bits are Ethernet frames, TCP segments, UDP datagrams, IP packets, etc.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

I claim:

1. A method for a security agent executing in a first data compute node (DCN) to monitor the first DCN, the first DCN comprising a first network stack associated with a first network address for processing network packets sent to and from other applications operating on the first DCN using the first network address, the method comprising:
at the security agent executing in the first DCN:
identifying a security request to send to a second security DCN that operates outside of the first DCN;
based on the identification, using a second network stack that supports fewer protocols than the first network stack and is associated with a second, different network address specific to the security agent of the first DCN to process one or more network packets communicating the security request; and
sending the network packets to the second security DCN.

2. The method of claim 1, wherein the second network stack is instantiated prior to the instantiation of the first network stack on the first DCN.

3. The method of claim 2, wherein each DCN, of a plurality of DCNs operating in a network, comprises a security agent with its own network stack separate from a primary network stack of the DCN, wherein each separate security agent network stack is configured to use a same link-local address to reach the second security DCN upon instantiation of the separate security agent network stack and does not require further configuration to communicate with the second security DCN.

4. The method of claim 1, wherein the first DCN and the second security DCN operate on a single physical host computer.

5. The method of claim 1, wherein the first DCN and the second security DCN operate on separate physical host computers in the network.

6. The method of claim 1, wherein the first network stack receives network packets having the first network address as a destination network address and the second network stack receives network packets having the second network address as a destination network address.

7. The method of claim 1, wherein the first DCN comprises a first network interface associated with the first network stack and the first network address and a second network interface associated with the second network stack and the second network address.

8. The method of claim 7, wherein the second interface provides screen access to the first DCN.

9. The method of claim 1, wherein the first DCN comprises a single network interface associated with both the first and second network stacks and the first and second network addresses.

10. A non-transitory machine readable medium storing a security agent for execution by at least one processing unit of a host machine, wherein the security agent executing in a first data compute node (DCN) on the host machine to monitor the first DCN, the first DCN comprising a first network stack associated with a first network address for processing network packets sent to and from other applications operating on the first DCN using the first network address, the security agent comprising sets of instructions for:
identifying a security request to send to a second security DCN that operates outside of the first DCN;
based on the identification, using a second security agent network stack associated with a second, different network address specific to the security agent of the first DCN to process one or more network packets communicating the security request, wherein, upon instantiation, the second security agent network stack is configured to use a same link-local address to reach the second security DCN as is used by a plurality of security agent network stacks of a plurality of DCNs operating in the network and does not require further configuration to communicate with the second security DCN; and
sending the network packets to the second security DCN.

11. The non-transitory machine readable medium of claim 10, wherein the set of instructions for identifying the security request comprises sets of instructions for:
detecting a change in a file system of the first DCN; and
generating the security request based on the file system change.

12. The non-transitory machine readable medium of claim 10, wherein the set of instructions for identifying the security request comprises sets of instructions for:
capturing an outgoing network packet sent by an application operating on the first DCN via the first network stack; and
generating the security request based on the outgoing network packet.

13. The non-transitory machine readable medium of claim 10, wherein the set of instructions for identifying the security request comprises sets of instructions for:
capturing an incoming network packet sent to an application operating on the first DCN via the first network stack; and
generating the security request based on the incoming network packet.

14. The non-transitory machine readable medium of claim 10, wherein the security agent further comprises sets of instructions for:
receiving an incoming network packet having a destination network address associated with the second security agent network stack; and
processing the incoming network packet as a security response from the second security DCN.

15. The non-transitory machine readable medium of claim 14, wherein the set of instructions for processing the incoming network packet as a security response comprises a set of instructions for associating a security tag with the first DCN.

16. The non-transitory machine readable medium of claim 14, wherein the set of instructions for processing the incoming network packet as a security response comprises a set of instructions for dropping a set of network packets associated with the security request.

17. The non-transitory machine readable medium of claim 14, wherein the set of instructions for processing the incoming network packet as a security response comprises a set of instructions for quarantining a set of files associated with the security request.

18. The non-transitory machine readable medium of claim 14, wherein the set of instructions for processing the incoming network packet as a security response comprises a set of instructions for blocking network packets between the first DCN and a set of additional DCNs associated with the security request.

19. The non-transitory machine readable medium of claim 14, wherein the set of instructions for processing the incoming network packet as a security response comprises a set of instructions for modifying a set of quality of service (QoS) policies for network packets associated with the security request.

20. The non-transitory machine readable medium of claim 10, wherein the second security agent network stack supports fewer protocols than the first network stack.

\* \* \* \* \*